US012305437B2

(12) United States Patent
Gstrein

(10) Patent No.: US 12,305,437 B2
(45) Date of Patent: May 20, 2025

(54) HINGE ASSEMBLY

(71) Applicant: Julius Blum GmbH, Hoechst (AT)

(72) Inventor: Florian Gstrein, Wolfurt (AT)

(73) Assignee: JULIUS BLUM GMBH, Hoechst (AT)

( * ) Notice: Subject to any disclaimer, the term of this patent is extended or adjusted under 35 U.S.C. 154(b) by 137 days.

(21) Appl. No.: 17/863,935

(22) Filed: Jul. 13, 2022

(65) Prior Publication Data

US 2022/0349227 A1 Nov. 3, 2022

Related U.S. Application Data

(63) Continuation of application No. PCT/AT2021/060013, filed on Jan. 14, 2021.

(30) Foreign Application Priority Data

Jan. 17, 2020 (AT) .............................. A 50033/2020

(51) Int. Cl.
*E05D 7/04* (2006.01)
*E05D 3/02* (2006.01)
(Continued)

(52) U.S. Cl.
CPC ............ *E05D 7/0415* (2013.01); *E05D 3/02* (2013.01); *E05D 7/123* (2013.01); *E05D 5/065* (2013.01);
(Continued)

(58) Field of Classification Search
CPC ......... E05D 7/0415; E05D 3/02; E05D 7/123; E05D 6/065; E05D 2007/0492;
(Continued)

(56) References Cited

U.S. PATENT DOCUMENTS 5,937,479 A * 8/1999 Ohshima ................ E05D 7/125 16/257
6,266,848 B1 7/2001 Fraccaro et al.
(Continued)

FOREIGN PATENT DOCUMENTS

AT 006 964 6/2004
CN 110603366 12/2019
(Continued)

OTHER PUBLICATIONS

International Search Report issued Apr. 19, 2021 in International (PCT) Application No. PCT/AT2021/060013.

*Primary Examiner* — Jason W San
*Assistant Examiner* — Matthew J Sullivan
(74) *Attorney, Agent, or Firm* — Wenderoth, Lind & Ponack, L.L.P.

(57) ABSTRACT

A hinge assembly includes an installing body to be secured on a furniture carcass; a furniture hinge which has two fitting parts interconnected via at least one joint axle; and a locking device, by which one of the fitting parts of the furniture hinge can be releasably locked to the installing body. The fitting part of the furniture hinge to be locked on the mounting body has three plates arranged one above the other. A first of the three plates faces towards the mounting body in a locked position, a third of the three plates occupies an outer position, and a second of the three plates occupies a central position between the first of the three plates and the third of the three plates. At least three pin-like retaining parts are mounted on the second of the three plates.

26 Claims, 2 Drawing Sheets

(51) Int. Cl.
*E05D 7/12* (2006.01)
*E05D 5/06* (2006.01)
*E05F 3/20* (2006.01)

(52) U.S. Cl.
CPC ........ *E05D 2007/0492* (2013.01); *E05F 3/20* (2013.01); *E05Y 2900/20* (2013.01)

(58) Field of Classification Search
CPC . E05D 3/183; E05D 3/142; E05F 3/20; E05Y 2900/20
See application file for complete search history.

(56) References Cited

U.S. PATENT DOCUMENTS

| | | | | |
|---|---|---|---|---|
| 6,996,877 | B2 * | 2/2006 | Booker | E05D 7/0407 16/382 |
| 7,017,231 | B2 * | 3/2006 | Isele | E05D 7/0407 16/382 |
| 7,213,300 | B1 * | 5/2007 | Domenig | E05D 7/04 16/236 |
| 7,231,691 | B1 * | 6/2007 | Domenig | E05D 7/0415 16/236 |
| 8,276,241 | B2 * | 10/2012 | Wu | E05D 7/0415 16/382 |
| 9,328,545 | B1 * | 5/2016 | Ng | E05D 7/0415 |
| 9,347,248 | B2 * | 5/2016 | Ng | E05D 7/0407 |
| 9,464,472 | B2 * | 10/2016 | Ng | E05D 7/0415 |
| 9,874,049 | B1 * | 1/2018 | McGregor | E05D 5/065 |
| 10,030,427 | B2 * | 7/2018 | McGregor | E05D 11/10 |
| 11,111,711 | B2 | 9/2021 | Capur et al. | |
| 11,808,071 | B2 * | 11/2023 | Cai | E05D 7/0407 |
| 11,988,030 | B2 * | 5/2024 | Gstrein | E05D 7/125 |
| 12,000,189 | B2 * | 6/2024 | Gstrein | E05D 7/0423 |
| 2004/0163211 | A1 | 8/2004 | Rucker | |
| 2006/0137139 | A1 * | 6/2006 | Wu | E05D 7/0423 16/236 |
| 2016/0032636 | A1 * | 2/2016 | Dai | E05F 5/006 16/65 |
| 2019/0390492 | A1 | 12/2019 | Capur et al. | |
| 2021/0148147 | A1 | 5/2021 | Capur et al. | |
| 2022/0349228 | A1 * | 11/2022 | Gstrein | E05D 7/0423 |
| 2022/0349229 | A1 * | 11/2022 | Gstrein | E05D 7/0415 |
| 2023/0332446 | A1 * | 10/2023 | Isler | E06B 3/482 |
| 2024/0151082 | A1 * | 5/2024 | Gstrein | E05D 5/065 |

FOREIGN PATENT DOCUMENTS

| | | |
|---|---|---|
| EP | 0 982 455 | 3/2000 |
| JP | 10-37573 | 2/1998 |
| JP | 2017-96065 | 6/2017 |
| WO | 2018/147818 | 8/2018 |
| WO | 2018/204946 | 11/2018 |
| WO | 2020/005174 | 1/2020 |

* cited by examiner

HINGE ASSEMBLY

BACKGROUND OF THE INVENTION

The present invention relates to a hinge assembly comprising an installing body to be fastened on a furniture carcass, in particular on a frame of the furniture carcass, a furniture hinge which has two fittings connected to one another via at least one, in particular precisely one, hinge pin, and a locking device with which one of the fittings of the furniture hinge can be locked, in particular releasably, to the installing body.

Such hinge assemblies are already known from the state of the art. It is also already known that the position of the two fittings relative to one another is settable. However, technically complex setting devices are used for this, which require a large installation space and make the furniture hinge unstable.

SUMMARY OF THE INVENTION

The object of the present invention is to at least partially remedy these disadvantages and to provide a hinge assembly which is improved compared with the state of the art and which creates the prerequisite for a convenient setting of the position of the two fittings relative to one another, and is characterized by a compact construction and at the same time a high stability.

According to the invention, the fitting of the furniture hinge to be locked on the installing body has three panels arranged (stacked) one over another, a first of the three panels faces the installing body in a locked position, a third of the three panels adopts an outer position, a second of the three panels adopts a middle position between the first of the three panels and the third of the three panels and at least three pin-shaped retaining parts are provided, which are mounted on the second of the three panels.

Because three panels arranged one over another are provided, various possible settings can be implemented by setting in each case two of the three panels relative to one another.

Because at least three pin-shaped retaining parts which are mounted on the second of the three panels are provided, a compact and very stable construction is possible.

According to a preferred embodiment, the at least three pin-shaped retaining parts are arranged substantially parallel to one another, and/or are arranged substantially parallel to the at least one hinge pin, and/or at least two of the three pin-shaped retaining parts are spaced apart from one another in a direction transverse to the at least one hinge pin.

It has proved to be advantageous that, preferably circular, mounting openings, in which the at least three pin-shaped retaining parts are mounted, are arranged in the second of the three panels, preferably wherein the second of the three panels has at least two side bars spaced apart from one another and the mounting openings are arranged in the side bars.

A setting device for height adjustment can be provided, by which the second of the three panels is displaceable relative to the first of the three panels.

In this connection, it is appropriate that the second of the three panels is displaceable relative to the first of the three panels in a direction parallel to the at least one hinge pin, and/or the setting device for height adjustment has a rotatably mounted setting wheel, preferably wherein the setting wheel is rotatably connected to the first of the three panels via a mounting point and is supported on the second of the three panels, and/or the third of the three panels is displaceable relative to the first of the three panels synchronously with the second of the three panels through the setting device for height adjustment, and/or at least two of the at least three pin-shaped retaining parts form a guide, along which the second of the three panels is displaceable relative to the first of the three panels, and/or, preferably circular, guide openings, in which at least two of the at least three pin-shaped retaining parts are displaceably mounted, are arranged in the first of the three panels, preferably wherein the first of the three panels has at least two side bars spaced apart from one another and the guide openings are arranged in the side bars.

A setting device for depth adjustment can be provided, by which the third of the three panels is displaceable relative to the second of the three panels.

In this connection, it is appropriate that the third of the three panels is displaceable relative to the second of the three panels in a direction transverse to the at least one hinge pin, and/or the setting device for depth adjustment has a rotatably mounted setting wheel, preferably wherein the setting wheel is rotatably connected to the second of the three panels via a mounting point and is supported on the third of the three panels, and/or the first of the three panels is displaceable relative to the third of the three panels synchronously with the second of the three panels through the setting device for depth adjustment, and/or the third of the three panels has oblong holes, in which one of the at least three pin-shaped retaining parts is displaceably mounted, preferably wherein the third of the three panels has at least two side bars spaced apart from one another and the oblong holes are arranged in the side bars.

It has proved to be advantageous that the third of the three panels is secured against a lifting off from the second of the three panels at least by one of the at least three pin-shaped retaining parts.

The two fittings of the furniture hinge can be connected to one another via at least one articulated lever separate from the two fittings.

In this connection, it is appropriate that a setting device for lateral adjustment is provided, by which a position of the at least one articulated lever relative to the fitting to be locked on the installing body is settable, preferably wherein the fitting to be locked on the installing body, preferably the third of the three panels, has at least one linear guide for the settable mounting of the articulated lever, and/or the setting device for lateral adjustment has a rotatably mounted setting wheel, preferably wherein the setting wheel is rotatably connected to the first of the three panels via a mounting point and is supported on the articulated lever, and/or all three panels are synchronously displaceable relative to the at least one articulated lever through the setting device for lateral adjustment, and/or the fitting to be locked on the installing body is displaceable relative to the at least one articulated lever in a direction transverse to the at least one hinge pin through the setting device for lateral adjustment.

According to a preferred embodiment, at least one of the three panels, preferably all three of the three panels, is formed U-shaped in cross section at least in regions, preferably wherein the U shape is open in the direction towards the installing body, and/or has at least two side bars spaced apart from one another.

It has proved to be favorable that at least one of the at least three pin-shaped retaining parts represents a part of the locking device and has an outer contour, and that the locking device has a locking contour corresponding to the outer contour of the at least one retaining part, wherein the locking contour has at least one first part which is formed stationary and at least one second part that is movable, preferably pivotable, relative to the first part, wherein in a locked position the at least one retaining part is received between the two parts of the locking contour.

In other words, the locking contour is designed at least in two parts and comprises a stationary first part and at least one second part that is movable relative to the first part, wherein in the locked position the first and the second part of the locking contour surround the retaining part to be fastened. In the locked position the retaining part is thus held both in a friction-locking manner and in a positive-locking manner by the first and second parts of the locking contour.

This has the particular advantage that the retaining part, when the movable second part of the locking contour is actuated, continues to be held in position in a positive-locking manner by the stationary first part of the locking contour, without the retaining part performing a movement relative to the first part of the locking contour. The components to be locked (i.e. the installing body and the retaining part of a fitting) are separable from one another only by a releasing movement carried out intentionally. This represents a safety aspect because the danger of an unintentional release of the locking device and a fall of the furniture part is significantly reduced.

It has proved to be advantageous that both parts of the locking contour are arranged on the installing body and the at least one retaining part is arranged on the fitting of the furniture hinge to be locked, and/or the outer contour of the at least one retaining part is formed cylindrical at least in regions, and/or the at least one stationary first part of the locking contour is formed on a hook element, preferably wherein the first part of the locking contour is open in the direction of the fitting, which is connected to the fitting to be locked via the at least one hinge pin, and/or the at least one stationary first part of the locking contour has a concave, preferably semi-circular, portion in cross section, and/or the two parts of the locking contour together form a three-quarter circle in cross section, and/or are arranged offset relative to one another in a direction parallel to the at least one hinge pin, and/or the locking contour has at least two stationary first parts, which are spaced apart from one another in a direction parallel to the at least one hinge pin, wherein the at least one second part of the locking contour is arranged between the at least two stationary first parts.

Because the two parts of the locking contour together form a three-quarter circle in cross section, and/or are arranged offset relative to one another in a direction parallel to the at least one hinge pin, a stable and particularly tilt-proof connection between the installing body and the at least one retaining part results.

It is appropriate that the at least one second part of the locking contour is formed on a lever, preferably wherein at one end the lever is mounted rotatable about a pivot pin, and/or a spring element, preferably a leg spring or leaf spring, is provided which applies a force to the lever in the direction of the locked position, and/or the lever has a free end on which the second part of the locking contour is arranged, and/or the lever has a free end on which an actuating element for manually unlocking the locking device is arranged.

It has proved to be favorable that a further one of the at least three pin-shaped retaining parts represents a part of the locking device, wherein at least one receiving device is provided, in which the at least one further retaining part can be arranged, preferably wherein the at least one receiving device is open in the direction of the fitting, which is connected to the fitting to be locked via the at least one hinge pin.

A particularly advantageous embodiment is that the fitting, which is connected to the fitting to be locked via the at least one hinge pin, is formed as a hinge cup, preferably wherein a damping device for damping a movement of the two fittings of the furniture hinge relative to one another is arranged in a cavity of the hinge cup, particularly preferably wherein a damping power of the damping device is settable, preferably by a switch.

BRIEF DESCRIPTION OF THE DRAWINGS

Further details and advantages of the present invention arise from the following description of the figures.

DETAILED DESCRIPTION OF THE INVENTION

Figure 1A:
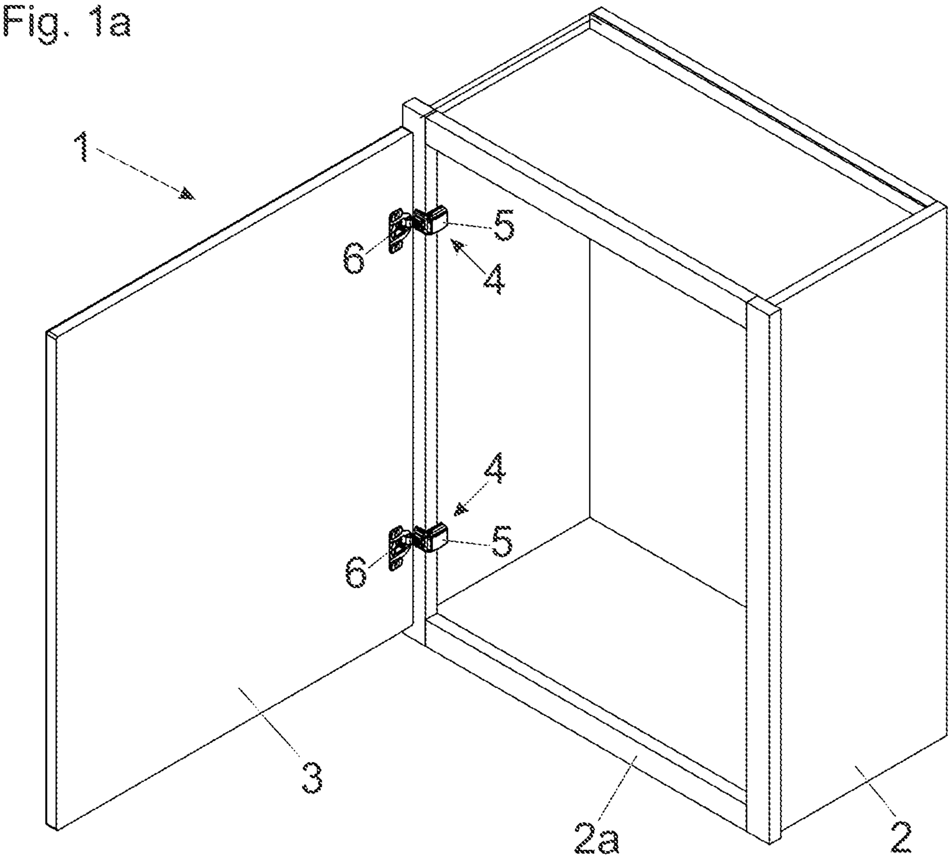
FIGS. 1*a*, 1*b* show a perspective view of a piece of furniture with a furniture carcass and a furniture part mounted movable relative to the furniture carcass, as well as a perspective view of a furniture hinge for the movable mounting of the furniture part.

FIG. 1*a* shows a perspective view of a piece of furniture 1 with a furniture carcass 2 and a furniture part 3, which is mounted pivotable relative to the furniture carcass 2 by two or more furniture hinges 4. The furniture hinges 4 have two fittings 5, 6 connected to one another in an articulated manner, wherein a first fitting 5 of the furniture hinge 4 is to be fastened on the furniture carcass 2 and a second fitting 6 of the furniture hinge 4 is to be fastened on the movable furniture part 3.

In the embodiment shown, the furniture hinges 4 are formed as so-called frame hinges. The first fitting 5 of the furniture hinge 4 can be designed as an angled hinge arm 5*a* (FIG. 1*b*), which is to be fastened on a frame 2*a* of the furniture carcass 2.

Figure 1B:
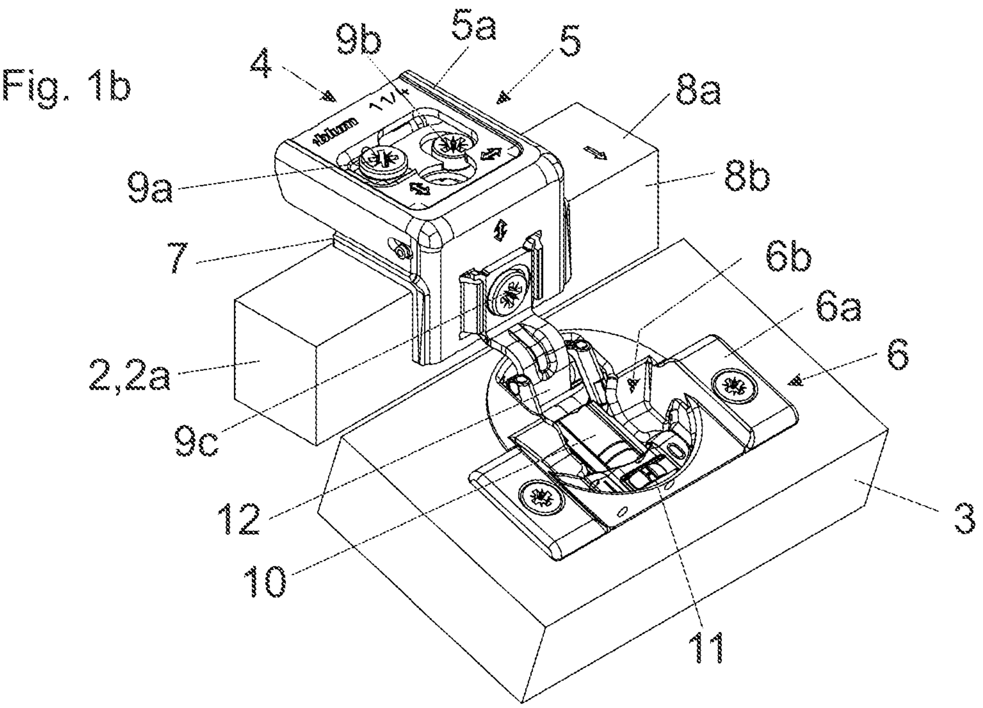

FIG. 1*b* shows the furniture hinge 4 in an installed state on the frame 2*a* of the furniture carcass 2. The first fitting 5 in the form of the hinge arm 5*a* is designed substantially L-shaped, wherein a first limb of the L-shaped hinge arm 5*a* can be attached to a narrow side 8*a* of the frame 2*a* and a second limb of the L-shaped hinge arm 5*a* can be attached to a side face 8*b* of the frame 2*a*.

The first fitting 5 in the form of the hinge arm 5*a* is to be fastened on the furniture carcass 2 via an installing body 7, wherein in a first installation step the installing body 7 is to be fastened on the furniture carcass 2, preferably on the frame 2*a*. In a subsequent installation step the first fitting 5 can be locked toollessly (without a tool) to the installing body 7 pre-installed on the furniture carcass 2 and can be unlocked toollessly.

A position of the furniture part 3 in an installed state on the furniture carcass 2 is settable by at least one or more setting devices 9*a*, 9*b*, 9*c*. Preferably, three setting devices 9*a*, 9*b*, 9*c* are provided, by which a three-dimensional setting of the furniture part 3 relative to the furniture carcass 2 can be made possible. A depth setting of the movable furniture part 3 can be brought about by the first setting device 9*a*, a height setting can be brought about by the second setting device 9*b* and a lateral setting can be brought about by the third setting device 9*c*. At least one, preferably all, of the setting devices 9*a*, 9*b*, 9*b* have a rotatably mounted setting wheel (for example, an eccentric, a spiral disk or a setting screw).

The second fitting 6 of the furniture hinge 4 can be designed as a hinge cup 6*a*, which is pivotably connected to the first fitting 5 via at least one hinge pin 14 (FIG. 2), preferably precisely one hinge pin 14. The hinge cup 6*a* has a cavity 6*b*, in which a damping device 10 for damping a movement of the two fittings 5, 6 of the furniture hinge 4 relative to one another is arranged. The damping device 10 can comprise at least one, preferably hydraulic, piston-cylinder unit, which can be loaded by a pivotable articulated lever 12 of the furniture hinge 4 in the case of a predefined position of the fittings 5, 6 relative to one another. A damping power of the damping device 10 can be limited or deactivated by a movably mounted switch 11 with at least two switch positions.

Figure 2:
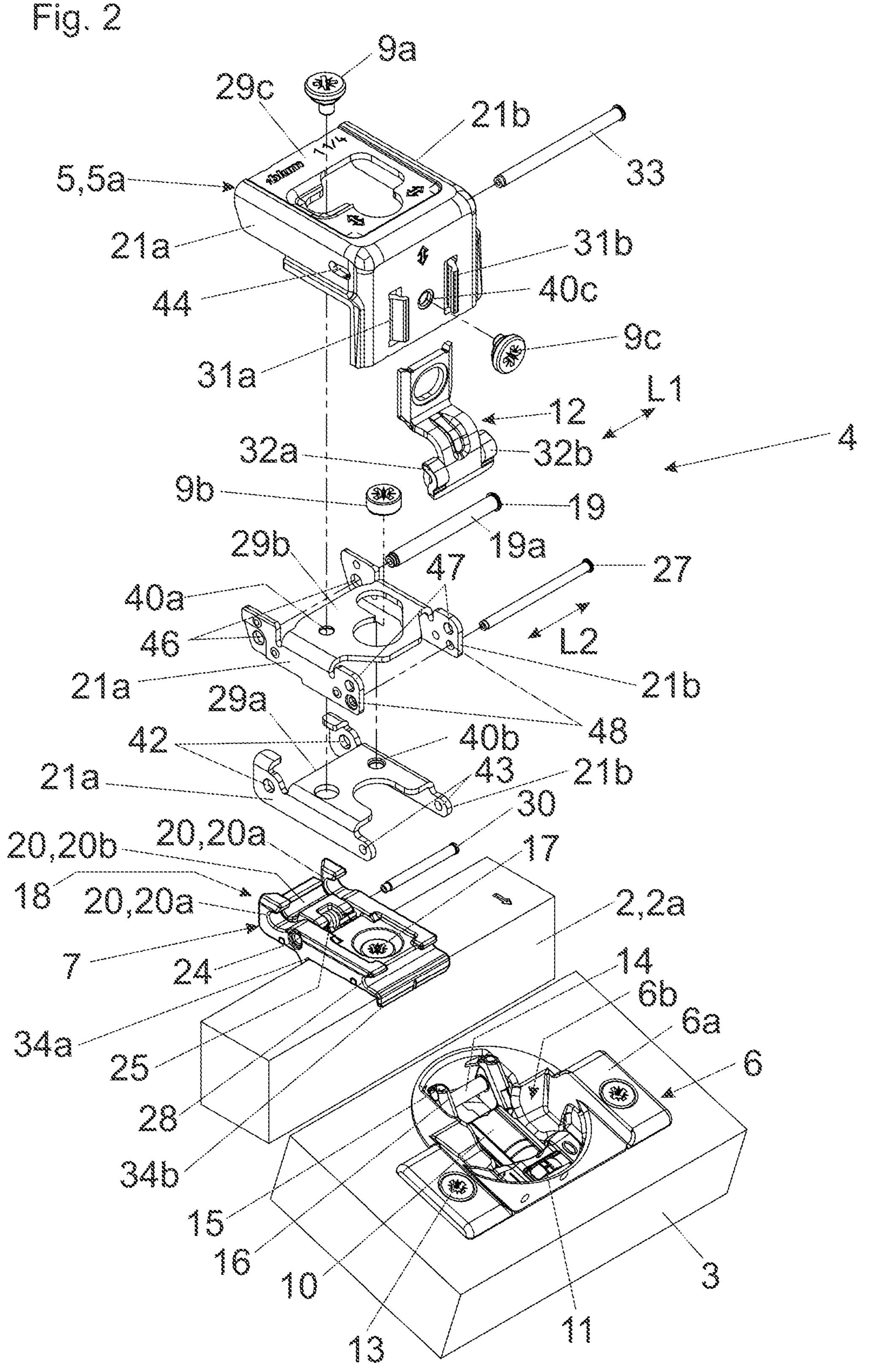
FIG. 2 shows the furniture hinge to be fastened on the installing body in an exploded representation.

FIG. 2 shows the furniture hinge 4 shown in FIG. 1*b*, which can be releasably locked to the installing body 7 to be fastened on the furniture carcass 2. The second fitting 6 of the furniture hinge 4 can be designed as a hinge cup 6*a*. The hinge cup 6*a* is to be sunk in a drilled hole in the movable furniture part 3, wherein the hinge cup 6*a* is to be fastened on the movable furniture part 3 by at least one fastener 13 (for example by a screw or at least one expansion part).

The damping device 10 for damping a movement of the furniture hinge 4 is arranged in the cavity 6*b* of the hinge cup 6*a*. The second fitting 6 is pivotably connected to the first fitting 5 via at least one, preferably precisely one, hinge pin 14.

The furniture hinge 4 has a spring device (spring) 15, by which the second fitting 6 is movable into a closed and/or into an open end position relative to the first fitting 5. In the embodiment shown, the spring device 15 is designed as a leg spring, wherein the two ends of the leg spring in each case have a plastic sheath 16. The plastic sheaths 16 in each case rest against a control curve 32*a*, 32*b* of the first fitting 5 in an assembled state of the furniture hinge 4, whereby the friction is reduced and the fittings 5, 6 are movable relative to one another smoothly and practically without generating noise.

The installing body 7 is to be fastened on the furniture carcass 2, preferably on the frame 2*a*, for example via at least one screw 17. The installing body 7 has at least two protrusions 34*a*, 34*b*, which can be attached to opposite sides of the frame 2*a* for improved pre-positioning of the installing body 7.

The first fitting 5 can be releasably locked to the installing body 7 by a locking device 18. The locking device 18 comprises at least one retaining part 19 with a, preferably cylindrical, outer contour 19*a* and a locking contour 20 corresponding thereto. The locking contour 20 has at least one first part 20*a* formed stationary and at least one second part 20*b* that is movable, preferably pivotable, relative to the first part 20*a*. In a locked position, the at least one retaining part 19 is received between the two parts 20*a*, 20*b* of the locking contour 20.

The at least one retaining part 19 can be formed in a simple manner as a cylindrical pin. The fitting 5 to be locked can have at least two side bars 21*a*, 21*b* spaced apart from one another, between which the cylindrical pin is arranged.

The movable second part 20*b* of the locking contour 20 is pretensioned by a spring element (spring) 25, preferably a leg spring or leaf spring, which applies a force to the second part 20*b* of the locking contour 20 in the direction of the locked position. The movable second part 20*b* of the locking contour 20 is mounted rotatable about a bolt 30, which forms the pivot pin 24 for the movable second part 20*b* of the locking contour 20.

The two fittings 5, 6 of the furniture hinge 4 can be connected to one another via at least one articulated lever 12 separate from the two fittings 5, 6. A position of the at least one articulated lever 12 relative to the fitting 5, 6 to be locked on the installing body (in this case relative to the hinge arm 5*a*) is settable by the setting device 9*c*. For this purpose, the first fitting 5 can have at least one linear guide 31*a*, 31*b* for the settable mounting of the articulated lever 12.

The fitting 5 of the furniture hinge 4 to be locked on the installing body 7 can have at least two, preferably precisely three, panels 29*a*, 29*b*, 29*c* arranged one over another. The at least two panels 29*a*, 29*b*, 29*c* are displaceable relative to one another and/or pivotable relative to one another through at least one setting device 9*a*, 9*b*, 9*c*. For the linear setting of the panels 29*a*, 29*b*, 29*b* relative to one another, at least two pin-shaped retaining parts 19, 27, 33 can be provided, along which the at least two panels 29*a*, 29*b*, 29*c* are linearly displaceable relative to one another.

In the embodiment shown, the setting devices 9*a*, 9*b*, 9*c* in each case have an eccentric. The eccentric of the first setting device 9*a* is rotatably connected (preferably by orbital riveting) to the second panel 29*b* via the mounting point 40*a* and is supported on the third panel 29*c* with its eccentric control contour.

The eccentric of the second setting device 9*b* is rotatably connected (preferably by orbital riveting) to the first panel 29*a* via the mounting point 40*b* and is supported on the second panel 29*b* with its eccentric control contour.

The eccentric of the third setting device 9*c* is rotatably connected (preferably by orbital riveting) to the first panel 29*a* via the mounting point 40*c* and is supported on the articulated lever 12 with its eccentric control contour.

Of course, it is also possible for the setting devices 9*a*, 9*b*, 9*c* also to have, instead of the eccentric, a worm gear or a rotatable spiral disk, which cooperates with protrusions of the component to be set spaced apart from one another.

For the installation of the first fitting 5 of the furniture hinge 4 on the installing body 7, the installing body 7 is to be fastened on the furniture carcass 2, in particular on the frame 2*a* of the furniture carcass 2, via the screw 17 in a first installation step. An improved pre-positioning of the installing body 7 relative to the frame 2*a* of the furniture carcass 2 is made possible by the protrusions 34*a*, 34*b*.

The first fitting 5 comprises the two retaining parts 19, 27 spaced apart from one another, and each has a cylindrical outer contour in the embodiment shown. The two retaining parts 19, 27 are spaced apart from one another in a direction transverse to the at least one hinge pin 14 and in each case have a longitudinal direction L1, L2, which longitudinal directions run substantially parallel to one another.

The installing body 7 is provided with the locking contour 20, which has the two stationary first parts 20*a* and the movable second part 20*b*. The second part 20*b* is mounted movable between the two stationary parts 20*a*. The locking contour 20 of the installing body 7 can be releasably locked to the retaining part 19 of the fitting 5. The installing body 7 additionally has a receiving device 28 for receiving the further retaining part 27 of the first fitting 5.

The fitting 5 is placed on the installing body 7 and moved in the direction of a joining movement. Through the movement of the fitting 5 in the direction of the joining movement, the second part 20*b* of the locking contour 20 is moved about the pivot pin 24 against a force of the spring element 25.

The two retaining parts 19, 27 can be arranged in the locking contour 20 and in the at least one receiving device 28, respectively, through a single common, preferably translational, joining movement. Through a continued movement of the fitting 5 in the direction of the joining movement, the second part 20*b* of the locking contour 20 snaps back due to a force of the spring element 25 and thereby locks the retaining part 19 in a friction-locking and in a positive-locking manner. The two parts 20*a*, 20*b* of the locking contour 20 together form a three-quarter circle in cross section and/or are arranged offset relative to one another in a direction parallel to the at least one hinge pin 14.

The locking between the installing body 7 and the fitting 5 is releasable again through the exertion of force on the second part 20*b* of the locking contour 20 against a force of the spring element 25. The exertion of force on the second part 20*b* for releasing the locking can be effected for example manually, i.e. without the use of a tool. Alternatively, a tool can also be used for the exertion of force on the second part 20*b* for releasing the locking between the installing body 7 and the fitting 5.

The invention claimed is:

1. A hinge assembly comprising:

an installing body to be fastened on a furniture carcass, a furniture hinge including two fittings connected to one another via a hinge pin, a locking device configured to releasably lock a first one of the two fittings to the installing body, and a height setting device for height adjustment, wherein the first one of the two fittings of the furniture hinge to be locked on the installing body has three panels stacked one over another, a first of the three panels facing the installing body in a locked position, a third of the three panels adopting an outer position, a second of the three panels adopting a middle position between the first of the three panels and the third of the three panels, at least three pin-shaped retaining parts are mounted on the second of the three panels, and the height setting device is configured to displace the second of the three panels relative to the first of the three panels.

2. The hinge assembly according to claim 1, wherein the at least three pin-shaped retaining parts are arranged substantially parallel to one another, and/or are arranged substantially parallel to the hinge pin, and/or at least two of the three pin-shaped retaining parts are spaced apart from one another in a direction transverse to the hinge pin.

3. The hinge assembly according to claim 1, wherein mounting openings receiving the at least three pin-shaped retaining parts are arranged in the second of the three panels.

4. The hinge assembly according to claim 1, wherein:

the second of the three panels is displaceable relative to the first of the three panels in a direction parallel to the hinge pin, and/or the height setting device for height adjustment has a rotatably mounted setting wheel, and/or the third of the three panels is displaceable relative to the first of the three panels synchronously with the second of the three panels through the height setting device for height adjustment, and/or at least two of the at least three pin-shaped retaining parts form a guide along which the second of the three panels is displaceable relative to the first of the three panels, and/or, guide openings to displaceable receive at least two of the at least three pin-shaped retaining parts are arranged in the first of the three panels.

5. The hinge assembly according to claim 1, further comprising a depth setting device for depth adjustment, the depth setting device being configured to displace the third of the three panels relative to the second of the three panels.

6. A hinge assembly comprising:

an installing body to be fastened on a furniture carcass, a furniture hinge including two fittings connected to one another via a hinge pin, a locking device configured to releasably lock a first one of the two fittings to the installing body, and a depth setting device for depth adjustment, wherein the first one of the two fittings of the furniture hinge to be locked on the installing body has three panels stacked one over another, a first of the three panels facing the installing body in a locked position, a third of the three panels adopting an outer position, a second of the three panels adopting a middle position between the first of the three panels and the third of the three panels, and at least three pin-shaped retaining parts are mounted on the second of the three panels, the depth setting device being configured to displace the third of the three panels relative to the second of the three panels, and wherein the hinge assembly is further configured such that:

the third of the three panels is displaceable relative to the second of the three panels in a direction transverse to the hinge pin, and/or the depth setting device for depth adjustment has a rotatably mounted setting wheel, and/or the first of the three panels is displaceable relative to the third of the three panels synchronously with the second of the three panels by the depth setting device for depth adjustment, and/or the third of the three panels has oblong holes displaceably receiving the at least three pin-shaped retaining parts.

7. The hinge assembly according to claim 1, wherein the third of the three panels is secured against a lifting off from the second of the three panels by one of the at least three pin-shaped retaining parts.

8. The hinge assembly according to claim 1, wherein the two fittings of the furniture hinge are connected to one another via an articulated lever separate from the two fittings.

9. A hinge assembly comprising:

an installing body to be fastened on a furniture carcass, a furniture hinge including two fittings connected to one another via a hinge pin, the two fittings being connected to one another via an articulated lever separate from the two fittings, a locking device configured to releasably lock a first one of the two fittings to the installing body, and a lateral setting device for lateral adjustment, wherein the first one of the two fittings of the furniture hinge to be locked on the installing body has three panels stacked one over another, a first of the three panels facing the installing body in a locked position, a third of the three panels adopting an outer position, a second of the three panels adopting a middle position between the first of the three panels and the third of the three panels, and at least three pin-shaped retaining parts are mounted on the second of the three panels, and wherein the lateral setting device is configured to set a position of the articulated lever relative to the first one of the two fitting to be locked to the installing body.

10. The hinge assembly according to claim 1, wherein at least one of the three panels:

has at least portions U-shaped in cross section, and/or has at least two side bars spaced apart from one another.

11. A hinge assembly comprising:

an installing body to be fastened on a furniture carcass, a furniture hinge including two fittings connected to one another via a hinge pin, a locking device configured to releasably lock a first one of the two fittings to the installing body, wherein the first one of the two fittings of the furniture hinge to be locked on the installing body has three panels stacked one over another, a first of the three panels facing the installing body in a locked position, a third of the three panels adopting an outer position, a second of the three panels adopting a middle position between the first of the three panels and the third of the three panels, and at least three pin-shaped retaining parts are mounted on the second of the three panels, and wherein at least one of the at least three pin-shaped retaining parts forms a part of the locking device and has an outer contour, the locking device having a locking contour corresponding to the outer contour of the at least one of the at least three retaining parts, wherein the locking contour has a stationary first part and a movable second part movable relative to the first part, wherein the at least one of the at least three retaining parts is received between the first part and the second part of the locking contour in a locked position.

12. The hinge assembly according to claim 11, wherein:

both the first part and the second part of the locking contour are arranged on the installing body and the at least one of the at least three retaining parts is arranged on the fitting of the furniture hinge to be locked, and/or the outer contour of the at least one of the at least three retaining parts is formed at least partially cylindrical, and/or the stationary first part of the locking contour is formed on a hook element connected to the fitting to be locked via the hinge pin, and/or the stationary first part of the locking contour has a concave portion in cross section, and/or the first part and the second part of the locking contour together form a three-quarter circle in cross section, and/or are arranged offset relative to one another in a direction parallel to the hinge pin, and/or the stationary first part of the locking contour is a first one of at least two stationary first parts of the locking contour spaced apart from one another in a direction parallel to the hinge pin, wherein the second part of the locking contour is arranged between the at least two stationary first parts.

13. The hinge assembly according to claim 11, wherein the second part of the locking contour is on a lever.

14. The hinge assembly according to claim 11, wherein a second one of the at least three pin-shaped retaining parts forms a part of the locking device, the locking device further including a receiving device configured to receive the second one of the at least three retaining parts.

15. The hinge assembly according to claim 1, wherein a second one of the two fittings is a hinge cup.

16. A hinge assembly comprising:

an installing body to be fastened on a furniture carcass, a furniture hinge including two fittings connected to one another via precisely one hinge pin, and a locking device configured to releasably lock a first one of the two fittings to the installing body, wherein the first one of the two fittings of the furniture hinge to be locked on the installing body has three panels stacked one over another, a first of the three panels facing the installing body in a locked position, a third of the three panels adopting an outer position, a second of the three panels adopting a middle position between the first of the three panels and the third of the three panels, and at least three pin-shaped retaining parts are mounted on the second of the three panels.

17. The hinge assembly according to claim 3, wherein the mounting openings are circular, the second of the three panels has at least two side bars spaced apart from one another, and the mounting openings are arranged in the at least two side bars of the second of the three panels.

18. The hinge assembly according to claim 4, wherein:

the height setting device for height adjustment has a rotatably mounted setting wheel, and the setting wheel is rotatably connected to the first of the three panels via a mounting point and is supported on the second of the three panels, and circular guide openings to receive at least two of the at least three pin-shaped retaining parts are arranged in the first of the three panels, the first of the three panels has at least two side bars spaced apart from one another, and the guide openings are arranged in the at least two side bars of the first of the three panels.

19. The hinge assembly according to claim 6, wherein the depth setting device for depth adjustment has a rotatably mounted setting wheel, the setting wheel being rotatably connected to the second of the three panels via a mounting point and being supported on the third of the three panels, and the third of the three panels has oblong holes to receive one of the at least three pin-shaped retaining parts, the third of the three panels has at least two side bars spaced apart from one another, and the oblong holes are arranged in the side bars.

20. The hinge assembly according to claim 9, wherein:

the third of the three panels has a linear guide for adjusting a mounting of the articulated lever, and/or the lateral setting device has a rotatably mounted setting wheel, and the setting wheel is rotatably connected to the first of the three panels via a mounting point and is supported on the articulated lever, and/or all three panels are synchronously displaceable relative to the articulated lever through the lateral setting device for lateral adjustment, and/or the first fitting to be locked on the mounting body is displaceable relative to the articulated lever in a direction transverse to the hinge pin through the lateral setting device for lateral adjustment.

21. The hinge assembly according to claim 10, wherein all three of the three panels:

have at least portions formed U-shaped in cross section, the U-shape being open in the direction towards the installing body, and/or have at least two side bars spaced apart from one another.

22. The hinge assembly according to claim 11, wherein the movable second part is pivotable relative to the first part.

23. The hinge assembly according to claim 12, wherein:

the stationary first part of the locking contour is formed on a hook element, the first part of the locking contour being open in the direction of a second one of the two fittings, and/or the concave portion of the stationary first part of the locking contour is semi-circular in cross section.

24. The hinge assembly according to claim 13, wherein:

at one end the lever is mounted rotatable about a pivot pin, and/or the locking device includes one of a leg spring or leaf spring configured to apply a force to the lever in the direction of the locked position, and/or the lever has a free end on which the second part of the locking contour is arranged, and/or the lever has a free end on which an actuating element for manually unlocking the locking device is arranged.

25. The hinge assembly according to claim 14, wherein the receiving device is open in the direction of a second one of the two fittings.

26. The hinge assembly according to claim 15, further comprising a damping device configured to damp a movement between the two fittings of the furniture hinge relative to one another, the damping device being arranged in a cavity of the hinge cup, and a damping power of the damping device is adjustable by a switch.

* * * * *